April 29, 1941.   J. H. GORDON, JR   2,239,710
SYNCHRONIZING MECHANISM
Filed March 24, 1939
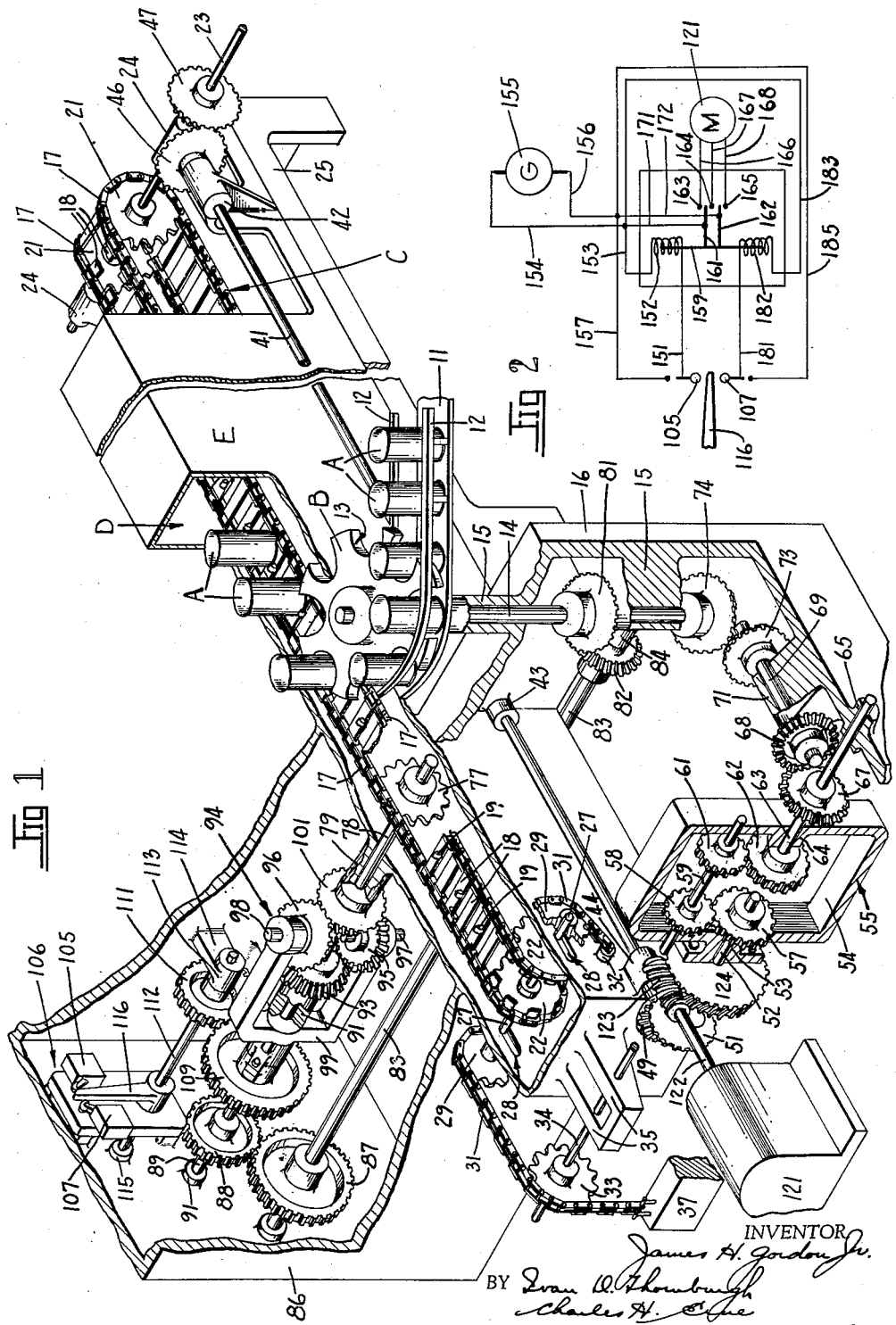
INVENTOR
James H. Gordon Jr.
BY Ivan W. Thornburgh
Charles H. Elbe
ATTORNEYS Patented Apr. 29, 1941

2,239,710

UNITED STATES PATENT OFFICE 2,239,710

SYNCHRONIZING MECHANISM

James H. Gordon, Jr., Union, N. J., assignor to American Can Company, New York, N. Y., a corporation of New Jersey Application March 24, 1939, Serial No. 264,016

6 Claims. (Cl. 198—22)

The present invention relates to a synchronizing mechanism and the like and has particular reference to maintaining a predetermined timed relation between moving machine parts which are apt to become unsynchronized in their cycle of movement.

In certain types of machines it is extremely difficult to maintain moving parts in their proper synchronism during their cycle of operations. By way of example, one such machine may include a long metallic link conveyor which is adapted to operate in synchronism with other moving parts such as a turret or the like for placing articles of manufacture on the conveyor in predetermined positions. When such a conveyor is subjected to temperature changes such as passing through ovens or other heated sections of a machine it expands and thereby results in an elongation or stretching of the conveyor parts. It has been found that such stretching alters the distance between predetermined places or spaces on the conveyor which places are adapted to receive the articles fed thereto. This stretching produces a change of lineal speed of the conveyor past a predetermined point adjacent its path of travel and hence throws the conveyor out of synchronism with feeding devices or other associated mechanism.

The present invention contemplates overcoming this difficulty by use of a synchronizing mechanism which constantly operates in accordance with the degree of stretch in the conveyor to adjust the speed of the associated feeding devices.

An object therefore of the invention is the provision of a synchronizing mechanism which is adapted to maintain at all times a predetermined timed relation between the speeds of machine parts which move through different cycles but which cooperate with each other in the operation of the machine.

Numerous other objects and advantages of the invention will be apparent as it is better understood from the following description, which, taken in connection with the accompanying drawing, discloses a preferred embodiment thereof.

Referring to the drawing:

Figure 1 is a perspective view of a machine which includes a synchronizing mechanism embodying the instant invention; and Fig. 2 is a wiring diagram of certain electric apparatus used in the mechanism.

As a preferred embodiment of the invention the drawing illustrates a container or can handling machine in which filled cans A (Fig. 1) from a suitable source of supply are received by a rotating turret B and are placed by the turret in predetermined positions on a long moving endless conveyor C. The conveyor is disposed in a chamber D which is preferably heated in any suitable manner for treating the can contents as the cans are conveyed therethrough. This chamber is enclosed by a casing E which also supports most of the moving parts of the machine and serves as a main frame for the machine. At the discharge end of the conveyor the treated cans may be removed therefrom in any suitable manner and thus discharged to a desired place of deposit.

The cans A enter the machine by way of a runway 11 the machine end of which is secured to a side wall of the casing E. The cans are maintained in single file or line by guide rails 12 which are secured to the runway.

The turret B is located at the end of the runway 11 and is partially disposed in an opening formed in the side wall of the casing E. This turret is provided with spaced pockets 13 which receive individual cans moving along the runway and the turret propels them through the casing opening and into the chamber D. Inside the chamber the turret places the cans onto the conveyor C. The turret is mounted on the upper end of a vertical shaft 14 carried in bearings 15 formed in a gear casing 16 adjacent the main frame E. The shaft is rotated as will hereinafter be explained.

The conveyor C comprises a long pair of spaced and parallel endless chains 17 which are connected transversely by cross-flights 18. These flights receive the cans A from the turret B. Each alternate flight is provided with a locating dog 19 which engages behind a can A placed thereon and holds the can in place while it is carried by the moving conveyor through the oven D.

The conveyor chains 17 take over pairs of spaced driving sprockets 21 located at the discharge end of the machine and over idler sprockets 22 which are located at the opposite end of the machine. The driving sprockets 21 are mounted on a driving shaft 23 journaled in bearings 24 formed on a frame extension 25 of the main frame E. The driving shaft is rotated from any suitable source of power, such as an electric motor or belt.

The idler sprockets 22 are loosely mounted on an idler shaft 27 which extends through slots 28 formed in the main frame E. The ends of the idler shaft project beyond and outside of the main frame and carry sprockets 29 having chains 31 which pass over them. Oen end of each chain is secured to a boss 32 formed on the main frame E. After passing over the sprockets 29 the chains extend over a second pair of sprockets 33 carried on the outer ends of a cross shaft 34 mounted in bearings formed in lugs 35 extended out from the end of the main frame. The outer ends of the chains depend from the sprockets 33 and are connected to and support a weight bar 37.

Thus the weight bar 37 draws the weight chains 31 taut over the sprockets 29, 33 and hence pulls on the idler sprocket shaft 27. This holds the conveyor chains 17 taut. With this construction any stretch occurring in the conveyor chains is immediately taken up by the weight bar and hence the conveyor is always maintained in a taut condition.

The can feed-in turret B hereinbefore mentioned is rotated in synchronism with the conveyor C so that the cans A advanced by the turret will be properly placed on the conveyor flights 18 relative to the locating dogs 19. For this purpose there is provided a long auxiliary drive shaft 41 which extends the full length of the machine. The shaft is journaled in bearings 42, 43, 44 formed respectively on the frame extension 25, the gear casing 16, and the main frame E.

One end of the auxiliary device shaft 41 carries a bevel gear 46 which meshes with and is driven by a bevel gear 47 mounted on the main drive shaft 23. The opposite end of the auxiliary drive shaft carries a bevel gear 49 which drives a bevel gear 51 mounted on a shaft 52 journaled in a bearing formed in the gear casing 16 and in a bearing 53 formed in a differential gear housing 54 of a differential unit 55 disposed in the gear casing.

The inner end of the shaft 52 carries a spur gear 57 which drives a pinion 58 mounted on a cross shaft 59 journaled in the differential housing. A second pinion 61 carried on the same shaft 59 meshes with a gear 62 mounted on a shaft 63 which is journaled in a bearing 64 of the differential housing 54 and in a bearing 65 in the gear casing 16.

Shaft 63 carries a bevel gear 67 which drives a bevel gear 68 mounted on one end of a shaft 69 journaled in a bearing 71 formed in the gear casing 16. The opposite end of the shaft 69 carries a bevel gear 73 which drives a bevel gear 74 mounted on the lower end of the turret shaft 14.

To insure the desired perfect timing between the can feed-in turret B and the conveyor C there is provided a conveyor speed detector mechanism which detects and is affected by a change in the lineal speed of the conveyor as a result of a stretch or other change in its length. This detector mechanism includes a detector sprocket 77 which engages in the links of one of the conveyor chains 17. The sprocket is located adjacent the turret B and is carried on a sprocket shaft 78 formed in the main frame E, and journaled adjacent one end in a bearing 79.

The detector sprocket 77 is normally positively driven in time with the rotation of the turret B. This is effected by a bevel gear 81 which is mounted on the turret shaft 14 and which drives a bevel gear 82 carried on a cross shaft 83 journaled at one end in a bearing 84 formed in the gear casing 16 and at its opposite end in a bearing formed in a detector housing 86 formed as a part of the main frame or casing E.

Inside the detector housing 86 the cross shaft 83 carries a gear 87 which drives a gear 88 mounted on a shaft 89 carried in bearings 91 formed in the detector housing. The inner end of the shaft carries a driving bevel gear 93 of an auxiliary differential gear unit 94. Bevel gear 93 meshes with a pair of oppositely disposed bevel gears 95, 96 mounted on short shafts 97, 98 carried in bearings formed in an auxiliary differential housing 99. Bevel gears 95, 96 mesh with a bevel gear 101 mounted on the detector sprocket shaft 78 and hence drives this shaft.

As long as the lineal speeds of the conveyor C and the turret B are the same, the cans A from the turret will pass into the proper space on the conveyor C. However, when an expansion or contraction of the chains 17 alter the length of the conveyor and tends to change its lineal speed so that the conveyor flights 18 will not properly align with the turret pocket 13, the detector mechanism comes into play. It operates through the differential unit 55 and through the auxiliary differential unit 94 and with suitable associated electric equipment and increases or decreases, as the case may be, the speed of the turret B and immediately restores full synchronism between conveyor and turret.

For example, where the conveyor chains 17 stretch in length, the distances between the conveyor dogs 19 increase. For all practical purposes this effect is the equivalent of a reduction in the lineal speed of the conveyor. Under such conditions the detector sprocket 77, rotating with the conveyor chains 17, slows down or rotates slower than normal and its shaft 78 also revolves at a slower speed relative to the constant rotation of its driving shaft 89. This difference in speed will be immediately compensated for in the auxiliary differential unit by a rotating action of the unit housing 99.

In a similar manner, a contraction of the conveyor chains 17 to less than their normal length will reduce the distance between the conveyor dogs 19 and thus effectively increase their lineal speed past the turret B. This increase in speed acts on the rotating parts of the machine in the same manner as a decrease in speed with the exception that the auxiliary differential housing will rotate in an opposite direction.

Rotation of the auxiliary differential unit 94 in one direction actuates an electric switch 105 (Figs. 1 and 2) of a switch unit 106 and when rotated in the opposite direction actuates an electric switch 107 of the same unit. There is secured to the auxiliary differential housing 99 a gear 109 which meshes with a gear 111 mounted on a switch shaft 112 carried in a bearing 113 of a bracket 114 formed on a wall of the detector casing 86 and in a bearing 115 formed in the casing 86. The switch shaft carries a vertically disposed arm 116 the upper end of which is normally maintained in a position midway between the electric switches 105, 107 as shown in Fig. 1.

Thus when the auxiliary differential housing rotates in one direction, its gear 109 rotates the gear 111 and hence shifts the arm 116 into engagement with either the switch 105 or the switch 107, as the case may be, to close a circuit connecting therewith. When the housing rotates in the opposite direction the arm 116 is correspondingly shifted to close the other one of the switches.

These electric switches 105, 107 control the operation of a reversible electric motor 121 which in turn regulates the speed of the turret B through the differential unit 55. For this purpose the motor is provided with a rotor shaft 122 carrying a worm 123 which meshes with a worm wheel 124 bolted to the housing 54 of the differential unit 55 in the gear casing 16.

By way of example, when the electric switch 105 is closed the motor 121 will rotate in a direction which will revolve the differential housing 54 to decrease the speed of the gears and shafts connecting with the turret B. This restores the turret to full synchronism with the speed of the conveyor C. Conversely, when the speed of the conveyor increases, the switch 107 is closed and this rotates the motor in the opposite direction. The differential housing 54 is therefore rotated opposite to that just described so that the speed of the turret B will be increased to correspond with the conveyor speed.

Referring now to the wiring diagram illustrated in Fig. 2 it will be observed that switch 105 is connected by a wire 151 to a solenoid 152 the opposite end of which is connected by wires 153, 154 to a source of electric energy such as an electric generator 155. The opposite side of the generator is connected by wires 156, 157 to the opposite side of the switch 105. Hence when switch 105 is closed, energy from the generator flows through and energizes the solenoid 152.

The solenoid 152 is provided with a movable core 159 having motor switch contacts 161, 162 which are disposed between stationary contacts 163, 164, 165 connected by respective lead wires 166, 167, 168 to the reversible motor 121. The motor switch contacts 161, 162 are also connected by respective wires 171, 172 to the generator wires 154, 156.

When the solenoid 152 is energized it draws in its core 159 and shifts the motor switch contacts 161, 162 into engagement with the two stationary contacts 163, 164. This completes a motor circuit connecting the motor with the generator and hence energy flows into the motor and rotates it in a predetermined direction as hereinbefore described for bringing the speed of the turret B into synchronism with the speed of the conveyor C. The motor will continue to operate in this direction as long as the switch 105 remains closed.

If a change in the lineal speed of the conveyor moves the switch arm 116 away from the switch, the latter opens and breaks the solenoid circuit. This deenergizes the solenoid and hence permits the movable core to shift back into its original open position. This shift is brought about by pressure of the usual spring housed within the solenoid. The motor switch is thus opened and the motor ceases operation.

The switch 107 is connected in a similar manner by a wire 181 to a solenoid 182, the opposite end of which is connected by a wire 183 to the generator wire 154. The solenoid 182 is disposed adjacent the solenoid 152 and surrounds the same movable core 159. The opposite side of the switch 107 is connected by a wire 185 to the generator wire 156. Hence when this switch 107 is closed by the arm 116 the solenoid 182 is energized and thus draws the movable core 159 into it. This shifts the motor switch contacts 161, 162 into engagement with the two stationary switch contacts 164, 165.

Energy from the generator thereupon flows through the motor 121 in a direction opposite to that explained above in connection with the switch 105. Hence the motor revolves in the opposite direction. When synchronism is restored the switch 107 opens by a shifting of its operating arm 116 and the solenoid circuit is broken and the solenoid 182 becomes deenergized. This permits the core 159 to shift back into its neutral original open position and open the motor switch. The motor thereby ceases its operation in this direction.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In conveying mechanism for advancing cans and the like through a treating machine, the combination of an endless chain conveyor which is subject to change in overall dimension for carrying cans in processional order through the machine, a transfer device for positioning cans on said conveyor in predetermined spaced relation, and synchronizing instrumentalities including a differential gear unit engaging and adapted to be actuated by said conveyor for increasing or decreasing the rate of operation of said transfer device in order to properly place the cans in the predetermined spaced position on said conveyor.

2. In conveying mechanism for advancing cans and the like through a treating machine, the combination of an endless chain conveyor which is subject to change in overall dimension for carrying cans in processional order through the machine, yieldable devices for keeping said conveyor chains taut, a transfer device for positioning cans on said conveyor in spaced predetermined relation, and synchronizing instrumentalities, including a differential gear unit engaging and an electric switch arm adapted to be actuated by said conveyor for increasing or decreasing the rate of operation of said transfer device in order to properly place the cans in predetermined spaced relation on said conveyor.

3. In a conveying mechanism for advancing cans and the like through a treating machine, the combination of an endless chain conveyor which is subject to change in overall dimension for carrying cans in processional order through the machine, a rotatable transfer turret adjacent said conveyor for placing cans in predetermined spaced positions thereon, turret driving means for rotating said turret in time with the normal linear speed of said conveyor, a rotatable detector element actuated by said turret driving means and engaging with said conveyor chain, an auxiliary differential unit associated with said detector element, said differential unit having a normally stationary housing which is adapted to be rotated by said detector element when said conveyor changes its overall dimension, and synchronizing instrumentalities set in motion by the rotation of said differential unit housing for increasing or decreasing the rate of rotation of said transfer turret in order to properly place the cans in the predetermined spaced relation on the dimensionally changed conveyor.

4. In conveying mechanism for advancing cans and the like through a treating machine, the combination of an endless chain conveyor which is subject to change in overall dimension for carrying cans in processional order through the machine, a detector element operable by said conveyor when the latter changes in dimension, a rotatable transfer turret adjacent said conveyor for placing cans in predetermined spaced positions thereon, turret driving means for rotating said turret in time with the normal linear speed of said conveyor, a differential unit between said turret and its driving means, said differential unit having a rotatable but normally stationary housing, devices for rotating said differential unit housing, and synchronizing instrumentalities operable by said detector element and adapted to set in motion said devices for rotating said differential unit housing for increasing or decreasing the rate of rotation of said transfer turret in accordance with the change in dimension of said conveyor in order that the cans will continue to be placed in predetermined spaced relation on said conveyor.

5. In conveying mechanism for advancing cans and the like through a treating machine, the combination of an endless chain conveyor which is subject to change in overall dimension for carrying cans in processional order through the machine, a detector element operable by said conveyor when the latter changes in dimension, a rotatable transfer turret adjacent said conveyor for placing cans in predetermined spaced positions thereon, turret driving means for rotating said turret in time with the normal linear speed of said conveyor, a differential unit between said turret and its driving means, said differential unit having a rotatable but normally stationary housing, a reversible electric motor for rotating said differential unit housing, and electric switch instrumentalities operable by said detector element and adapted to set in motion said reversible electric motor for rotating said differential unit housing to increase or decrease the rate of rotation of said transfer turret in accordance with the change in dimension of said conveyor in order that the cans will continue to be placed in predetermined spaced relation on said conveyor.

6. In conveying mechanism for advancing cans and the like through a treating machine, the combination of an endless chain conveyor which is subject to change in overall dimension for carrying cans in processional order through the machine, a detector element operable by said conveyor when the latter changes in dimension, a rotatable transfer turret adjacent said conveyor for placing cans in predetermined spaced positions thereon, turret driving means for rotating said turret in time with the normal linear speed of said conveyor, a differential unit between said turret and its driving means, said differential unit having a rotatable but normally stationary housing, a reversible electric motor for rotating said differential unit housing, and electric switch instrumentalities operable by said detector element in one direction when said conveyor elongates and in another direction when said conveyor contracts, said instrumentalities when operated setting in motion said reversible electric motor for rotating said differential unit housing in the corresponding direction to increase or decrease the rate of rotation of said transfer turret in accordance with the change in dimension of said conveyor in order that the cans will continue to be placed in predetermined spaced relation on said conveyor.

JAMES H. GORDON, Jr.